Dec. 15, 1925.　　　　　　　　　　　　　　1,566,217
J. KRONE
FOCUSING DEVICE FOR PHOTOGRAPHIC CAMERAS
Filed Dec. 7, 1921
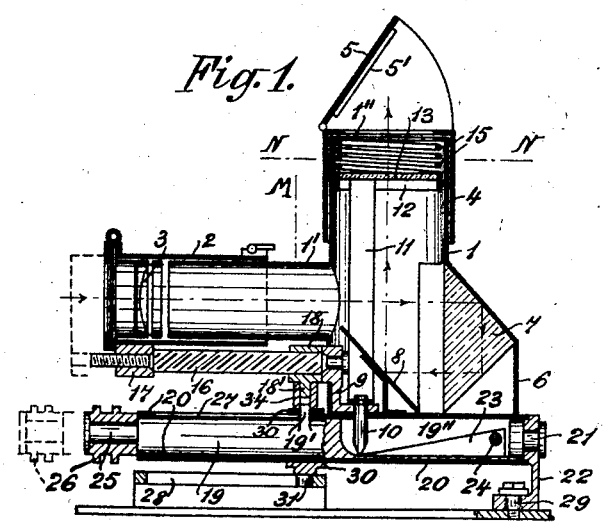
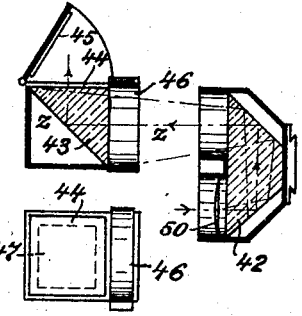
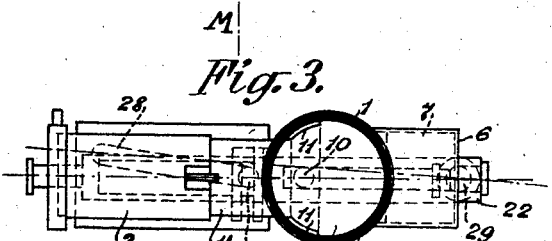
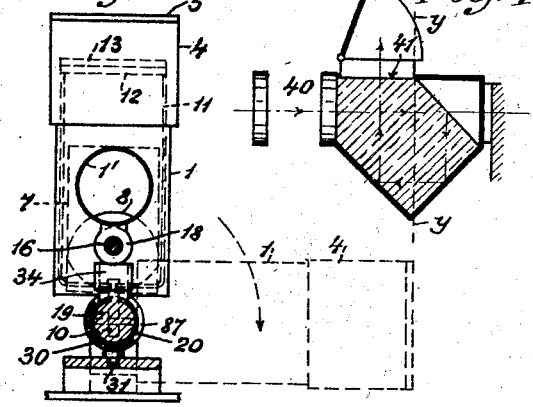
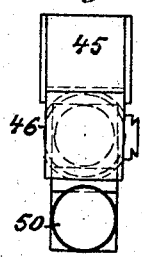
Inventor
Johannes Krone,
By Knight Bro.
Attys.

Patented Dec. 15, 1925.

1,566,217

UNITED STATES PATENT OFFICE.

JOHANNES KRONE, OF VIENNA, AUSTRIA, ASSIGNOR OF ONE-HALF TO ERNST SANDER, OF VIENNA, AUSTRIA.

FOCUSING DEVICE FOR PHOTOGRAPHIC CAMERAS.

Application filed December 7, 1921. Serial No. 520,758.

*To all whom it may concern:*

Be it known that I, JOHANNES KRONE, a citizen of Germany, residing in Vienna, Austria, have invented certain new and useful Improvements in Focusing Devices for Photographic Cameras, of which the following is a specification.

This invention relates to a focusing device for photographic apparatus in which the adjustment of the said device is automatically controlled by the adjustment of the optical lens of the photographic camera.

The focusing device according to the present invention comprises an objective lens, a compartment containing an opal glass screen and surfaces for deflecting the rays of light onto the said screen, a screw rotatably secured to the said compartment and provided with a steep and a flat screw thread, the flat screw threaded part of the said screw being connected with the objective lens in order to adjust the latter, means for rotating the screw, the said means being disposed parallel to the said screw and being adapted to be connected to and adjusted by the adjustment of the objective lens of the photographic camera and further is connected with the said screw in order to rotate during its adjustment the latter and thereby adjust the objective lens of the focusing device, the pitches of the two screw threads are chosen in such a manner, that the adjustment of the objective lens of the focusing device is in proper relation to the adjustment of the objective lens of the photographic camera.

The accompanying drawings illustrate by way of example two modes of carrying out the present invention.

Fig. 1 is a vertical section through a focusing device according to the present invention.

Fig. 2 is a front view of the device illustrated in Fig. 1, part of this view being shown in section on line M—M of Fig. 1.

Fig. 3 is a plan view of the device illustrated in Fig. 1, part of this view being shown in section on line N—N of Fig. 1.

Figs. 4, 5, 6 and 7 show modified details of the focusing device illustrated in Figs. 1 to 3.

The focusing device shown in Figs. 1, 2 and 3 comprises a vertical casing 1 furnished with a horizontal tube 1', a sleeve 2 provided with a lens 3 being slidably arranged on the latter. A sleeve 4, furnished with a hinged cover 5, is slidably arranged on the vertical casing 1, and a mirror 5' is attached to the inside of the said cover 5. The lower part of the casing 1 contains a mirror 8 and is enlarged to a receptacle 6 for the reception of a prism 7. Further a bracket 9 is arranged in the lower part of the casing 1, the said bracket being furnished with a hole through which a movable pin 10 is passing. A frame 11 carrying a ring 12 containing an opal glass screen 13 is secured to the end of the pin 10. The upper end of casing 1 is furnished with an inwardly directed flange 1'', and a spring 15 is situated between the said flange and the opal glass screen. By means of its reduced end, a screw 16 is rotatably secured to the bracket 9, part of this screw being provided with a steep screw thread and part of it with a flat screw thread. A nut 17 for the flat screw threaded part of the screw 16 is rigidly secured to the movable sleeve 2, whilst the steep screw threaded part of the screw 16 passes through a nut 18 provided with an extension 18', which projects into the hole of a distance-tube 34 located between the nut 18 and a ring 30, slidably mounted on a cylinder 20 arranged underneath the casing 1. By means of its extension 18', the nut 18 is secured against rotation. A longitudinally movable piston 19 is arranged in the cylinder 20, the said piston being provided with an upwardly directed extension 19', which passes through a slot 27 in the cylinder 20 and penetrates into the hole of the distance tube 34.

A trunnion 21 is secured to the right hand side end of the cylinder 20 and rests in a bracket 22, which is pivotally secured to the base-plate of the photographic apparatus by means of a pivot 29. The right hand side portion of the piston 19 is slotted to form a recess 19'' for the reception of a wedge 23, which is removably secured to the piston 19 by means of a removable pin 24. The left hand side end of the piston 19 is provided with a trunnion 25, which passes through a forked sleeve 26, the latter being connected to the adjustable part of the photographic apparatus. The ring 30 is loosely and slidably mounted on the cylinder 20 and is provided with a pin 31, adapted to slide in a slot 28 extending angularly with respect to the axis of the main optics of the photographic apparatus (Fig. 3) in order to avoid parallax between the focusing device and camera.

The focusing device acts in the following manner:—

On adjusting the main optics of the photographic apparatus for objects of short distance the piston 19 and its wedge 23 are moved outwardly as the forked sleeve 26 is connected to the adjustable part of the photographic apparatus, while the cylinder 20 is secured against longitudinal movement by the journal 29 and the bracket 22. During this movement the pin 10 will ride up the incline of the wedge 23 and lift the opal glass screen 13 against the action of the spring 15, thereby lengthening the distance between the said screen and the mirror 8. This adjustment between the screen and mirror is carried out in a right angle to the axis of the main light ray. On moving the piston 19 and thus also the wedge 23 inwardly, the compressed spring 15 will force the opal glass screen 13 and thus also the pin 10 downwardly, whereby the latter will ride down the incline of the wedge and thereby secure the continuous contact between pin and wedge. By this adjustment, which is carried out in a right angle to the main light ray, the distance between the opal glass screen 13 and the mirror 8 will be shortened.

Owing to the simultaneous longitudinal movement of the nut 18 and piston 19, the screw 16 is rotated and by means of the nut 17 operating on the flat screw-threaded part of the said screw, the sleeve 2 and thus also the lens 3 are moved out- or inwardly in accordance with the movement of the piston 19 and wedge 23. The relative movement between piston 19 and sleeve 2 depends on the relation between the steep and flat screw-threaded parts of the screw 16. The extreme outside positions of the piston and sleeve are indicated in dotted lines in Fig. 1.

The longitudinal movement of the piston 19 will effect also a rotation or swinging of the focusing device about its pivot 29, as the ring 30 or rather its pin 31 works in the inclined slot 28. Thus the axis of the focusing device will take up an inclined position with respect to the axis of the main optics of the photographic camera.

When taking distant objects, the piston 19 will be in its innermost position in the cylinder 20, the optic axes of the focusing device and photographic apparatus are parallel with one another and the opal glass screens of the photographic apparatus and of the focusing device show images of like penetration or clearness. If the piston 19 is in its extreme outside position, the photographic apparatus and focusing device are adjusted for taking near objects and the opal glass screens of the apparatus and the device show sharp or clear images. This agreement or harmony between the images on the two opal glass screens is present also at all intermediate positions of the piston, if the incline of the wedge 23 and the pitches of the screw 16 are properly selected.

As the pin 31 will move in the slot 28 during the movement of the piston 19 and thus impart to the axis of the focusing device a continuously varying inclination with respect to the axis of the main optics of the photographic camera, the result will be that by a proper selection of the shape and direction of the slot 28 the centre of the image on the opal glass screen of the photographic camera will agree exactly with the centre of the image appearing on the opal glass screen of the finder camera; this being the case in all positions of the piston 19.

If special circumstances afford it the whole focusing device, without prejudice to its exact and proper operation, may be turned for ninety degrees round the axis of the cylinder 20, as shown in dotted lines in Fig. 2. For attaining this object the ring 30 is provided with a radial slot 87.

The direction of the light-rays in the finder camera is indicated in Fig. 1 in dash-dotted lines. The image may be regarded either directly on the opal glass screen 13 or in the mirror 5.

However the invention is not limited to the adjustment of the opal glass screen 13 with respect to the mirror 8 as, without departing from the spirit of the invention, the opal glass screen may be secured against movement, while the mirror 8 may be adjustable to the said screen, however this adjustment being carried out also at a right angle with respect to the axis of the main light ray.

When replacing the lens of the photographic camera by a lens of another focal distance, it will be necessary to adapt the adjustment of the lens 3 as well as of the opal glass screen 13 to these changed optic conditions. This is accomplished either by replacing the wedge 23 by a wedge provided with another incline, or by replacing the screw 16 by a screw furnished with other pitches. As already mentioned the wedge 23 may be removed by detaching the pin 24, whilst the screw 16 is removed by lifting the pin 10 out of the bracket 9 and removing the latter together with its screw 16 from the finder camera.

The direction of the light-rays in the modified arrangement shown in Fig. 4 is the same as in the finder camera illustrated in Figs. 1, 2 and 3. This modified arrangement comprises a single prism, the light-rays passing through a lens 40 to the reflecting surface of the said prism, so that the real image will appear on the upper surface 41 of the prism which is formed and acts as the opal glass screen. The direction of the light rays is indicated by dotted lines and arrows. On separating the prism according to the plane y—y (Fig. 4), e. g. when employing two prisms and moving the same toward or away from one another during the adjustment, the length of the distance travelled by the light-rays will be doubled with respect to the distance by which the lens 40 has been adjusted. The same effect will be attained, if in the arrangement illustrated in Fig. 1 the prism 7 is moved towards or away from the mirror 8 in the direction of the optic axis.

Figs. 5, 6 and 7 show the application of separated prisms. The rays are conducted by a lens 50 and a prism 42 to a prism 43, whose upper surface 44 serves as the opal glass screen. The image may be regarded on the latter or in a mirror 45. The casing of the lens 50 and the prism 42 is attached to the fixed part of the photographic camera, whereas the casing of the prism 43 is held in a sleeve 46, which is secured to the movable part of the photographic camera and may be turned about the axis z—z. Owing to the separation and the separate arrangement of the prisms, a great range of adjustment of the focuser in the focusing device is rendered possible.

In case of forming only a part of the upper surface 44 of the focuser as the opal glass screen, for instance the part 47 indicated in dotted lines in Fig. 6, the same will serve for judging the sharpness of the image, whereas the outer clear frame-like part of the surface 44 will serve as ordinary finder and will exhibit the outline of the image.

Having thus described my invention, what I claim as new and desire to secure by Letters Patent is:—

1. A focusing device for photographic cameras, comprising in combination, an objective lens, a compartment containing an opal glass screen and surfaces for deflecting the rays of light onto the said screen, a screw rotatably secured to the said compartment and provided with a steep and a flat screw thread, the flat screw threaded part of the said screw being connected with the objective lens in order to adjust the latter, means for rotating the screw, the said means being disposed parallel to the said screw and being adapted to be connected to and adjusted by the adjustment of the objective lens of the photographic camera and further being connected with the said screw in order to rotate during its adjustment the latter and thereby adjust the objective lens of the focusing device, the pitches of the two screw threads being chosen in such a manner, that the adjustment of the objective lens of the focusing device is in proper relation to the adjustment of the objective lens of the photographic camera.

2. A focusing device for photographic cameras, comprising in combination, an objective lens, a compartment containing an opal glass screen, a prism and a mirror, the said prism and mirror serving for deflecting the rays of light onto the said screen and the latter being adjustable with respect to the mirror, a screw rotatably secured to the said compartment and provided with a steep and a flat screw thread, the flat screw threaded part of the said screw being connected with the objective lens in order to adjust the latter, means for rotating the screw, the said means being disposed parallel to the said screw and being adapted to be connected to and adjusted by the adjustment of the objective lens of the photographic camera and further being connected with the said screw in order to rotate during its adjustment the latter and thereby adjust the objective lens of the focusing device, as well as the screen relative to the mirror, the pitches of the two screw threads being chosen in such a manner, that the adjustment of the objective lens of the focusing device is in proper relation to the adjustment of the objective lens of the photographic camera.

3. A focusing device for photographic cameras, comprising in combination, an objective lens, a compartment containing an opal glass screen, a prism and a mirror, the said prism and mirror serving for deflecting the rays of light onto the said screen and the latter being adjustable with respect to the mirror in a right angle to the axis of the rays of light entering through the said objective lens, a screw rotatably secured to the said compartment and provided with a steep and a flat screw thread, the flat screw threaded part of the said screw being connected with the objective lens in order to adjust the latter, means for rotating the screw, the said means being disposed parallel to the said screw and being adapted to be connected to and adjusted by the adjustment of the objective lens of the photographic camera and further being connected with the said screw in order to rotate during its adjustment the latter and thereby adjust the objective lens of the focusing device, as well as the screen relative to the mirror, the pitches of the two screw threads being chosen in such a manner, that the adjustment of the objective lens of the focusing device is in proper relation to the adjustment of the objective lens of the photographic camera.

4. A focusing device for photographic cameras, comprising in combination, an objective lens, a compartment containing an opal glass screen, a prism and a mirror, the said prism and mirror serving for deflecting the rays of light onto the said screen and the latter being adjustable with respect to the mirror, a screw rotatably secured to the said compartment and provided with a steep and flat screw thread, the flat screw threaded part of the said screw being connected with the objective lens in order to adjust the latter, adjustable means for rotating the screw, the said means being disposed parallel to the said screw and being adapted to be connected to and adjusted by the adjustment of the objective lens of the photographic camera and further being connected with the said screw in order to rotate during its adjustment the latter and thereby adjust the objective lens of the focusing device, a wedge secured to the said means and moving therewith a pin secured to the opal glass screen and adapted to co-operate with the inclined face of the said wedge in order to move the said screen towards or away from the said mirror, the pitches of the two screw threads being chosen in such a manner, that the adjustment of the objective lens of the focusing device is in proper relation to the adjustment of the objective lens of the photographic camera.

5. A focusing device for photographic cameras, comprising in combination, an objective lens, a compartment containing an opal glass screen, a prism and a mirror, the said prism and mirror serving for deflecting the rays of light onto the said screen and the latter being adjustable with respect to the mirror, a screw rotatably secured to the said compartment and provided with a steep and flat screw thread, the flat screw threaded part of the said screw being connected with the objective lens in order to adjust the latter, adjustable means for rotating the screw, the said means being disposed parallel to the said screw and being adapted to be connected to and adjusted by the adjustment of the objective lens of the photographic camera and further being connected with the said screw in order to rotate during its adjustment the latter and thereby adjust the objective lens of the focusing device, a wedge secured to the said means and moving therewith, a pin secured to the said mirror and adapted to co-operate with the inclined face of the said wedge in order to move the said screen towards or away from the said mirror, the pitches of the two screw threads being chosen in such a manner, that the adjustment of the objective lens of the focusing device is in proper relation to the adjustment of the objective lens of the photographic camera.

6. A focusing device for photographic cameras, comprising in combination, an objective lens, a compartment containing an opal glass screen, a prism and a mirror, the said prism and mirror serving for deflecting the rays of light onto the said screen and the latter being adjustable with respect to the mirror, a screw rotatably secured to the said compartment and provided with a steep and flat screw thread, the flat screw threaded part of the said screw being connected with the objective lens in order to adjust the latter, adjustable means for rotating the screw, the said means being disposed parallel to the said screw and being adapted to be connected to and adjusted by the adjustment of the objective lens of the photographic camera and further is connected with the said screw in order to rotate during its adjustment the latter and thereby adjust the objective lens of the focusing device, a wedge removably secured to the said means and moving therewith, a pin secured to the opal glass screen and adapted to co-operate with the inclined face of the said wedge in order to move the said screen towards or away from the said mirror, the pitches of the two screw threads being chosen in such a manner, that the adjustment of the objective lens of the focusing device is in proper relation to the adjustment of the objective lens of the photographic camera.

7. A focusing device for photographic cameras, comprising in combination, an objective lens, a compartment containing an opal glass screen, a prism and a mirror, the said prism and mirror serving for deflecting the rays of light onto the said screen and the latter being adjustable with respect to the mirror, a screw rotatably secured to the said compartment and provided with a steep and flat screw thread, the flat screw threaded part of the said screw being connected with the objective lens in order to adjust the latter, adjustable means for rotating the screw, the said means being disposed parallel to the said screw and being adapted to be connected to and adjusted by the adjustment of the objective lens of the photographic camera and further being connected with the said screw in order to rotate during its adjustment the latter and thereby adjust the objective lens of the focusing device, a wedge removably secured to the said means and moving therewith a pin secured to the said mirror and adapted to co-operate with the inclined face of the said wedge in order to move the said screen towards or away from the said mirror, the pitches of the two screw threads being chosen in such a manner, that the adjustment of the objective lens of the focusing device is in proper relation to the adjustment of the objective lens of the photographic camera.

8. A focusing device for photographic cameras, comprising in combination, an objective lens, a compartment containing an opal glass screen and surfaces for deflecting the rays of light onto the said screen, a screw rotatably secured to the said compartment and provided with a steep and flat screw thread, a cylinder disposed parallel to the said screw, a piston adapted to be moved to and fro in the said cylinder by the adjustment of the objective lens of the photographic camera, a screw-nut secured to the piston and engaging the steep screw-threaded part of the screw, so that the nut has to follow the movements of the piston and thereby rotate the screw, and a screw-nut secured to the lens of the focusing device and engaging the flat screw-threaded part of the said screw, so that this lens will be subjected to a to and fro movement by the rotating screw, the pitches of the two screw threads of the screw being chosen in such a manner, that the adjustment of the objective lens of the focusing device is in proper relation to the adjustment of the objective lens of the photographic camera.

9. A focusing device for photographic cameras, comprising in combination, an objective lens, a compartment containing an opal glass screen, a prism and a mirror, the said prism and mirror serving for deflecting the rays of light onto the said screen and the latter being adjustable with respect to the mirror, a screw rotatably secured to the said compartment and provided with a steep and flat screw thread, a cylinder disposed parallel to the said screw, a piston adapted to be moved to and fro in the said cylinder by the adjustment of the objective lens of the photographic camera, a screw-nut secured to the piston and engaging the steep screw-threaded part of the screw, so that the nut has to follow the movements of the piston and thereby rotate the screw, a screw-nut secured to the lens of the focusing device and engaging the flat screw-threaded part of the said screw, so that this lens will be subjected to a to and fro movement by the rotating screw, the pitches of the two screw threads of the screw being chosen in such a manner, that the adjustment of the objective lens of the focusing device is in proper relation to the adjustment of the objective lens of the photographic camera, a wedge secured to the said piston so that the former has to follow the movements of the latter, and a pin secured to the opal glass screen and adapted to co-operate with the inclined face of the said wedge, in order to move the said screen towards or away from the said mirror.

10. A focusing device for photographic cameras, comprising in combination, an objective lens, a compartment containing an opal glass screen, a prism and a mirror, the said prism and mirror serving for deflecting the rays of light onto the said screen and the latter being adjustable with respect to the mirror, a screw rotatably secured to the said compartment and provided with a steep and flat screw thread, a cylinder disposed parallel to the said screw, a piston adapted to be moved to and fro in the said cylinder by the adjustment of the objective lens of the photographic camera, a screw-nut secured to the piston and engaging the steep screw-threaded part of the screw, so that the nut has to follow the movements of the piston and thereby rotate the screw, a screw-nut secured to the lens of the focusing device and engaging the flat screw-threaded part of the said screw, so that this lens will be subjected to a to and fro movement by the rotating screw, the pitches of the two screw threads of the screw being so chosen, that the adjustment of the objective lens of the focusing device is in proper relation to the adjustment of the objective lens of the photographic camera, a wedge secured to the said piston so that the former has to follow the movements of the latter, and a pin secured to the said mirror and adapted to co-operate with the inclined face of the wedge, in order to move the said screen towards or away from the said mirror.

11. A focusing device for photographic cameras, comprising in combination, an objective lens, a compartment containing an opal glass screen, a prism and a mirror, the said prism and mirror serving for deflecting the rays of light onto the said screen and the latter being adjustable with respect to the mirror, a screw rotatably secured to the said compartment and provided with a steep and flat screw thread, the flat screw threaded part of the said screw being connected with the objective lens in order to adjust the latter, adjustable means for rotating the screw, the said means being disposed parallel to the said screw and being adapted to be connected to and adjusted by the adjustment of the objective lens of the photographic camera and further being connected with the said screw in order to rotate during its adjustment the latter and thereby adjust the objective lens of the focusing device a wedge secured to the said means and moving therewith, a pin secured to the opal glass screen and adapted to co-operate with the inclined face of the said wedge in order to move the said screen towards or away from the said mirror, a spring arranged in the said compartment and acting upon the said screen for aiding the movement of the latter towards the said mirror, the pitches of the two screw threads being chosen in such a manner, that the adjustmen of the objective lens of the focusing device is in proper relation to the adjustment of the objective lens of the photographic camera.

12. A focusing device for photographic cameras, comprising in combination, an objective lens, a compartment containing an opal glass screen and surfaces for deflecting the rays of light onto the said screen, a screw rotatably secured to the said compartment and provided with a steep and a flat screw thread, the flat screw threaded part of the said screw being connected with the objective lens in order to adjust the latter, means for rotating the screw, the said means being disposed parallel to the said screw and being adapted to be connected to and adjusted by the adjustment of the objective lens of the photographic camera and further being connected with the said screw in order to rotate during its adjustment the latter and thereby adjust the objective lens of the focusing device, the pitches of the two screw threads being chosen in such a manner, that the adjustment of the objective lens of the focusing device is in proper relation to the adjustment of the objective lens of the photographic camera, and means for pivotally securing the focusing device to the photographic camera.

In testimony whereof I have signed my name to this specification.

JOHANNES KRONE.